United States Patent [19]

Bird et al.

[11] Patent Number: 4,999,921
[45] Date of Patent: Mar. 19, 1991

[54] ADJUSTABLE SPIRIT LEVEL

[76] Inventors: James M. Bird, 1095 Canyon; Dennis K. Hendricks, 646 Crestview, both of Idaho Falls, Id. 83402

[21] Appl. No.: 517,297

[22] Filed: May 1, 1990

[51] Int. Cl.⁵ .............................................. G01C 9/28
[52] U.S. Cl. ........................................ 33/388; 33/385
[58] Field of Search ........... 33/381, 382, 383, 385–389

[56] References Cited

U.S. PATENT DOCUMENTS

| 121,088 | 11/1871 | Davis | 33/385 |
|---|---|---|---|
| 288,624 | 11/1883 | Davis | 33/383 |
| 1,017,646 | 2/1912 | Broadmore | 33/386 |
| 1,624,161 | 4/1927 | Day | 33/385 |
| 2,814,128 | 11/1957 | Hopkinson | 33/388 X |
| 2,825,144 | 3/1958 | Warden et al. | 33/383 X |
| 3,894,342 | 7/1975 | Goode | 33/388 |

FOREIGN PATENT DOCUMENTS 771735 4/1957 United Kingdom .................. 33/388

Primary Examiner—Harry N. Haroian
Attorney, Agent, or Firm—Robert A. de Groot; Stephen A. Gratton

[57] ABSTRACT

An adjustable spirit level having a plurality of spirit levels therein. A first spirit level measures vertical orientation, a second adjustable spirit level is adjustable to a true horizontal position, and a third spirit level is adjustable to any desired position between vertical and horizontal. The second level may be adjusted with a rotatable cam-shaped end piece secured within the level body, while the third level is ratcheted to a predetermined angle. The third level may be held in place by a spring member biasing the level against the level body.

7 Claims, 4 Drawing Sheets

ADJUSTABLE SPIRIT LEVEL

BACKGROUND OF THE INVENTION

This invention relates to a spirit level which is easily adjusted to true horizontal using a known level surface. The inventive apparatus also comprises a rotatable spirit level adjustable to any desired angle relative to the horizontal, such that a surface may be aligned at the predetermined angle. In a preferred embodiment. The device comprises a plurality of bubble vials; one parallel to a flat contact surface of the device, one perpendicular to the contact surface and a third rotatably adjustable and calibrated between 0 and 90 degrees for angular measurement.

Adjustable spirit levels are well-known in the prior art. U.S. Pat. No. 716,001, issued Dec. 16, 1902, discloses a spirit level having multiple vials, rotatably adjustable by loosening threaded cylinders containing the vials. U.S. Pat. No. 1,133,936, issued Mar. 30, 1915, discloses a level utilizing a rotatably adjustable vial that was held within a toothed circular disc that allowing coarse adjustment by rotating and then clamping the disc, and vernier adjustment by a second rotatable internal disc. U.S. Pat. No. 1,264,161, issued Apr. 30, 1918, disclosed a combination square, spirit level and protractor having a calibrated and rotationally adjustable spirit level for use in measuring or laying out angled surfaces. U.S. Pat. No. 2,993,281, issued July 25, 1961, discloses a combination spirit level and protractor wherein the level can be rotated and in any angularly position by loosening a plurality of fasteners. U.S. Pat. No. 4,774,767, issued Oct. 4, 1988, discloses an angularly adjustable spirit level which can be secured in a desired position by a clamping jaw.

Carpenters and electricians have experienced two primary problems with available levels: firstly, the levels are manufactured with inexact tolerances that produce variability which is unacceptable in many construction trades, and secondly, the levels are not adjustable so as to permit either correction of the manufacturing inaccuracies or measurement of precise angles other than vertical or horizontal.

It is the purpose of this invention to provide adjustability to a fixed spirit level and to provide simple adjustability to a calibrated rotatable spirit level, such that the rotatable position can be securely fixed once adjusted.

SUMMARY OF THE INVENTION

The present invention provides a bubble-type spirit level which is easily calibrated and adjusted when placed on a known level surface. One end of the primary vial containing a liquid and a small air bubble is retained within a cap having an external cam. By rotating the end cap, one end of the vial is raised or lowered until the bubble is properly centered between the hairlines on the primary vial. The cap on the opposing end is coaxial within its mating holding surface. A gripping surface on the exterior of the cap provides a gripping location to rotate the cam cap. A secondary spirit level can be mounted at right angles to the primary level, utilizing a similar eccentric mounting cap.

A third spirit level provided on the apparatus can be adapted for rotation in fixed increments so that the level may be used to set a flat contact surface at a predetermined angle. The third spirit level is contained within a cylinder having a plurality of external teeth on a first lateral edge of the cylinder and an offset surface on a second lateral edge of the cylinder. The teeth on the cylinder engage a matching set of internal teeth on an inner surface of the level within which the cylinder is retained. The offset surface on the second lateral edge of the cylinder cooperates with a circular spring member therebetween. When the cylinder is compressed against the inner surface of the level, the teeth disengage and the third spirit level can be rotated and set for any desired angle.

DETAILED DESCRIPTION OF THE INVENTION

Figure 1:
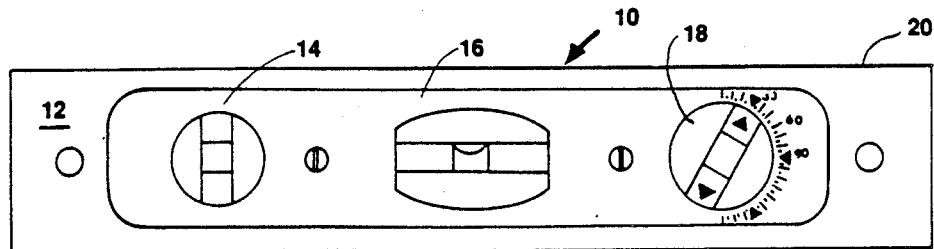
FIG. 1 is a side elevation view of a spirit level of the present invention.
Figure 2:
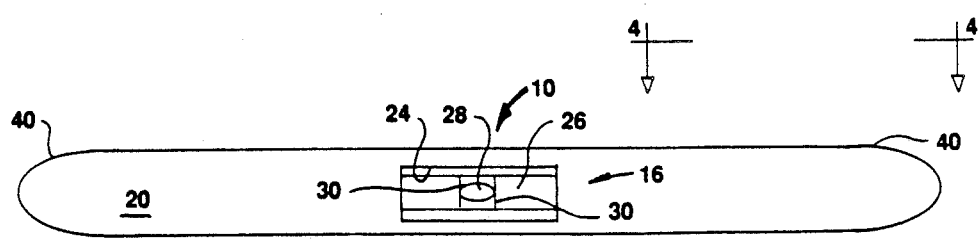
FIG. 2 is a top view of the spirit level.
Figure 3:
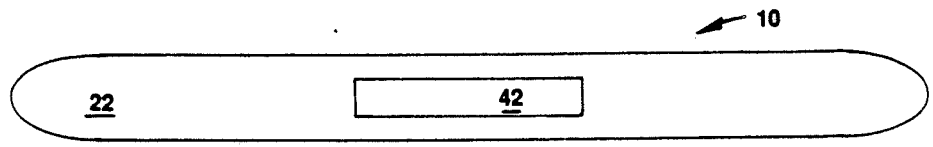
FIG. 3 is a bottom view of the spirit level.

As illustrated in FIG. 1, the inventive spirit level 10 comprises a body portion 12 a fixed first spirit level 14 and at least one other adjustable spirit level. For example, a second spirit level 16 is adjustable to precisely determined horizontal orientation of a subject surface, while a third spirit level 18 is adjustable to determine an orientation of from 0°-90° from the horizontal. The body portion 12 is provided with upper 20 and lower 22 parallel surfaces which determine the orientation of the various spirit levels. As illustrated, the spirit level 14 is adapted to measure a vertical orientation. As illustrated in FIG. 2, the upper surface 20 of the level 10 is provided with a window 24 permitting one to view the spirit level 16 from above, or through the upper surface 20. The second spirit level 16 comprises a glass vial 26 having a bubble 28 centered within a pair of sight lines 30. The level 10 may be provided with conventional torpedo-shaped end portions 40. The lower surface 22 of the level 10 (FIG. 3) may be provided with a magnetic strip 42 permitting the level to be removably affixed to a metal surface, such as a wiring conduit, for observation.

Figure 4:
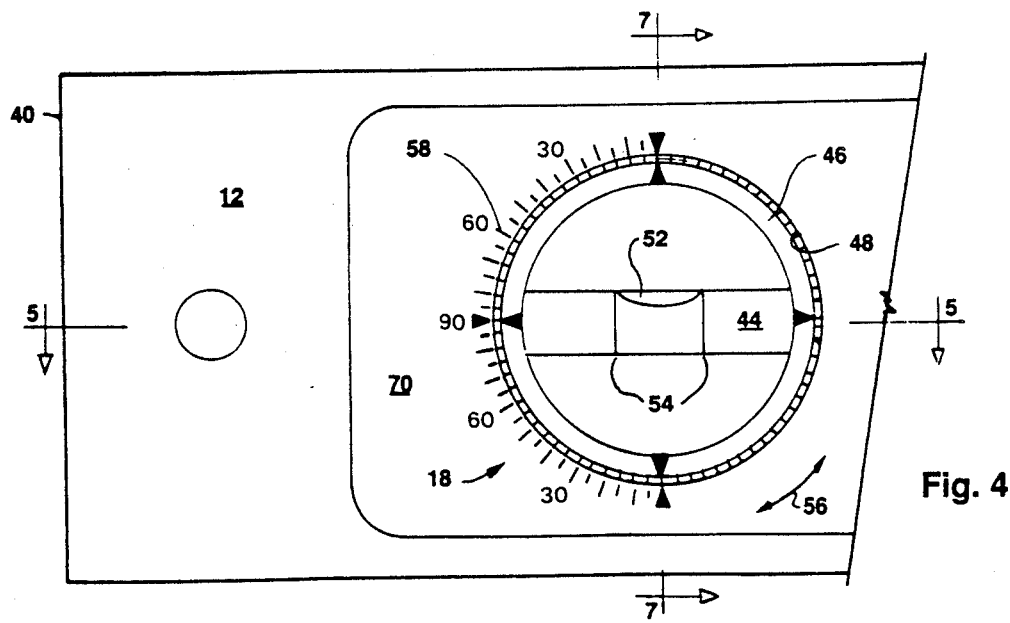
FIG. 4 is an enlarged elevation view of a portion of the present invention taken along lines 4—4 of FIG. 2.

The third spirit level 18 is shown in greater detail in FIG. 4. A vial 44, preferably of glass, plastic or other resilient transparent material, is retained within a retaining ring member 46, the ring member 46 being adjustably retained within an aperture 48 in level 10. Conventionally, the third spirit level 18 comprises a transparent vial 44 having a bubble 52 sized between a pair of sight lines 54. The ring member 46 is rotatably adjustable within the level 10 in the direction of arrow 56. The body portion 12 is provided with a plurality of incremental measurements 58 indicating the orientation of the vial 44 relative to horizontal. In the example of FIG. 4, horizontal is indicated at 90°, with increments provided from 0°–90° both above and below horizontal. Therefore, a 180° range of measurements is provided.

Figure 5:
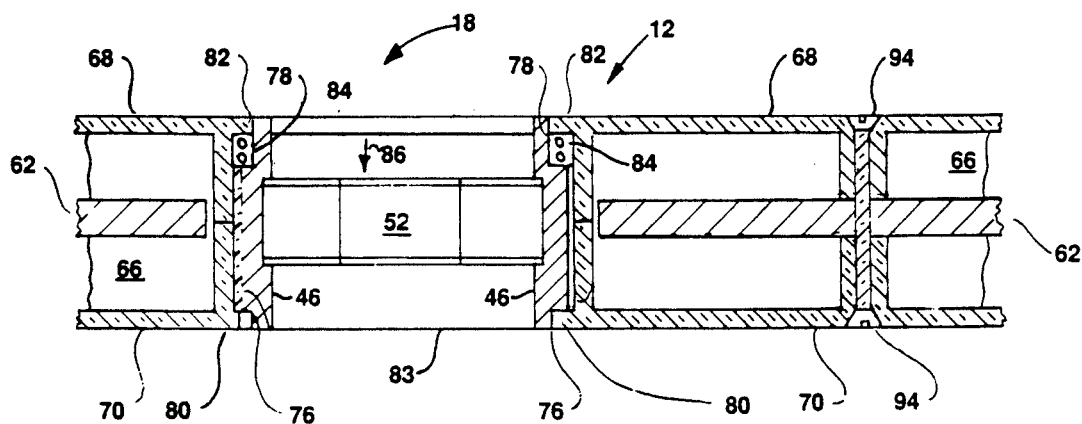
FIG. 5 is a sectional view taken along lines 5—5 of FIG. 4.

FIG. 5 illustrates in greater detail the arrangement of spirit level 18 within body portion 12. The body portion 12 comprises an I-beam member 60, preferably of aluminum, having an internal web portion 62 and a pair of end pieces 64, 66. On either side of the internal web 62 are front and back covers 68, 70 secured to the web 62. The spirit levels 14, 16, 18 are retained within the body of the level 10 between the covers 68, 70. The covers may be constructed from a durable plastic.

The third spirit level 18 is rotatably retained within the body portion 12. The vial 44 is fixedly secured within ring member 46. The ring is provided with lateral edge portions 76, 78 respectively, mating with cooperating lateral edge portions 80, 82 of covers 70, 68 respectively. As illustrated in FIG. 5, the edge portions 76, 80 are provided as cooperating ratchet-type teeth members while the lateral edge portions 78, 82 cooperate with a spring member 84 therebetween. Therefore, the spring member 84 biases the spirit level 18 in the direction of arrow 86 such that the ratcheting teeth of 76, 80 engage one another.

Figure 6:
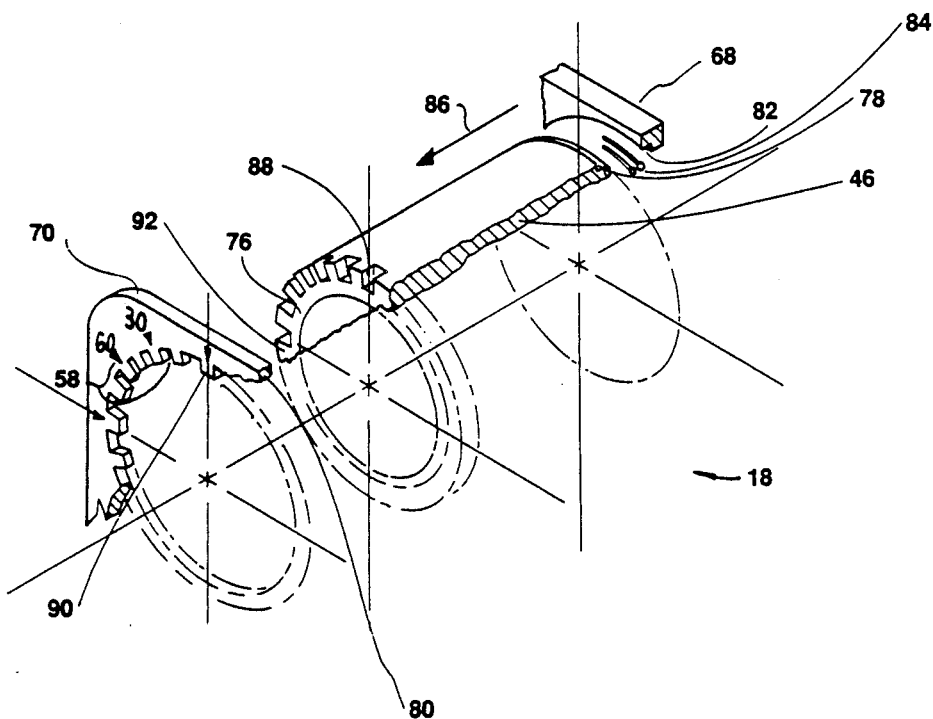
FIG. 6 is a exploded isometric view of the rotatable spirit level cylinder and back cover.
Figure 7:
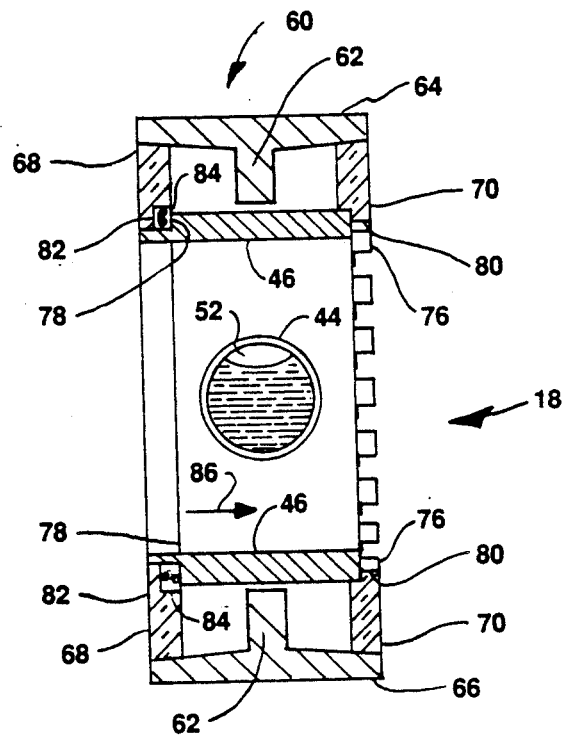
FIG. 7 is a section elevation taken along lines 7—7 of FIG. 4.
Figure 8:
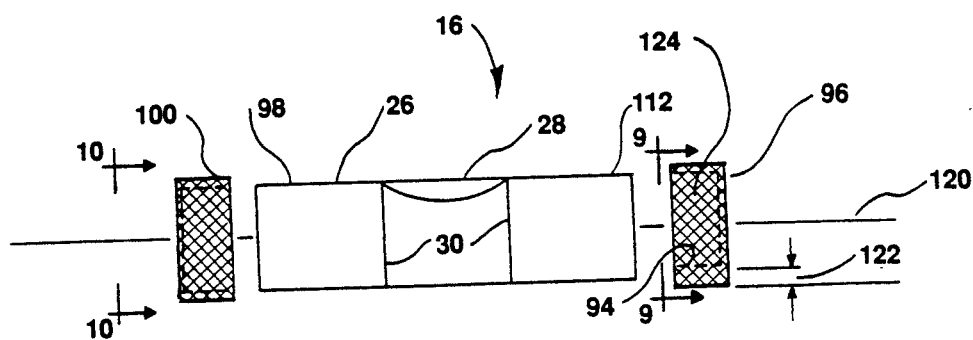
FIG. 8 is an elevation view of the eccentric and coaxial end caps and vial.

As illustrated more particularly in FIG. 6, the spring member 84 is retained between the lateral edge portions 78, 82. Teeth members 88 on ring member 46 cooperate with the teeth members 90 of cover 70. As illustrated, the spring member 84 biases the teeth 88 into engagement with teeth 90. In a preferred embodiment, both the lateral edge portion 76 and lateral edge portion 80 are provided with 72 equally-spaced teeth about the circumference of the respective edge portion, such that the spirit level 18 may be adjusted in 5° increments. By loading the spring member 84, and forcing the spirit level 18 in a direction opposite that shown by arrow 86, the teeth 88, 90 are disengaged and the level 18 may be rotated to any desired position. By aligning the indicator means 92 with the appropriate measurement 58, the spirit level 18 may be adjusted to a preset angular orientation.

The covers 68, 70 may be affixed to the I-beam 60 by any appropriate means, such as screws (indicated at 94 in FIG. 5), gluing, welding, etc.

Figure 9:
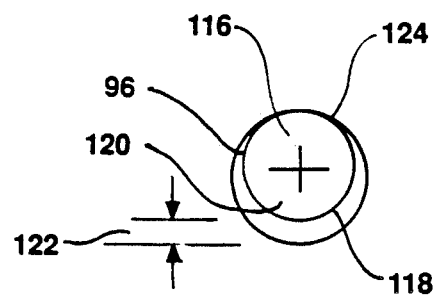
FIG. 9 is a view taken along lines 9—9 of FIG. 8.
Figure 10:
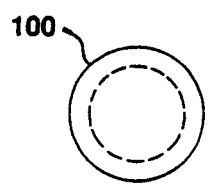
FIG. 10 is a view taken along lines 10—10 of FIG. 8.
Figure 11:
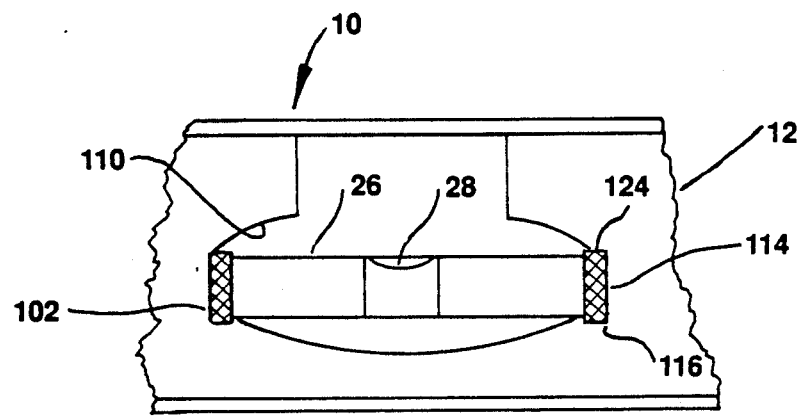
FIG. 11 is a partial elevation view of the glass vial supported in the I-beam section of the level body.

The second spirit level 16, as illustrated in FIGS. 8–11, is an adjustable level capable of being precisely set to an exact horizontal position. By placing the level member 10 on a known exact horizontal surface, a cam member 96 may be set to precisely center the bubble 28 within sight lines 30. A first end 98 of the vial 26 is secured within a receiving portion 99 of concentric end cap 100, which is in turn secured within one side 102 of an aperture 110 in level member 10. A second end 112 of vial 26 is retained within a receiving portion 94 of eccentric cam member cap 96. The cam member 96 is rotatably retained within a second end 114 of aperture 110. Cam member 96 is provided with an eccentric bearing surface 118 which supports the vial second end 112. As illustrated in FIG. 9, the cam member 96 and bearing surface 118, when rotated about axis 120, produces a height adjustment indicated at 122.

Therefore, if when the level member 10 is placed upon a known true horizontal surface, the bubble 28 is not precisely centered between sight lines 30, the cam member 96 may be rotated about axis 120 by engaging the finger adjusting surface 124 between a thumb and forefinger. By rotating the cam member 96 while the vial 26 remains stationary, the bearing surface 118 raises or lowers the vial 26 within the range 122. The cam member 96 may be rotated until the bubble 28 is exactly centered between sight lines 30.

It is to be appreciated that while the preferred embodiment of the invention illustrated in FIG. 1 incorporates three spirit levels, an apparatus can be provided with fewer than the three levels illustrated. For example, either of the second and third spirit levels 16, 18 may be provided singly or in combination with one another. Additionally, the inventive features of the second spirit level relating to the cam member 96 may be incorporated into the first or third spirit level, such that these levels are adjustable on different axes.

Likewise, the increments of adjustability of the third spirit level 18 may be determined by particular requirements or by limits of practicality in machining the various components. Therefore, the number of teeth may be increased or decreased beyond the 72 disclosed in order to provide greater or lesser precision in adjustability, i.e. 144 teeth would provide for 2½° increments.

While a preferred embodiment of the invention has been disclosed, various modes of carrying out the principles disclosed herein are contemplated as being within the scope of the following claims. Therefore, it is understood that the scope of the invention is not to be limited except as otherwise set forth in the claims.

We claim:

1. A spirit level having a level body supporting a first level member perpendicular to a lower surface, a second level member perpendicular to said first member and a third rotatably adjustable level member, comprising:
   a. a glass vial;
   b. a cylindrical retaining ring supporting ends of the glass vial;
   c. a plurality of teeth on a first end of the retaining ring;
   d. a matching plurality of teeth on a back cover fastened to a back of the level body;
   e. a second end of the retaining ring in contact with a compression spring;
   f. a front cover fastened to a front of the level body retaining the compression spring, wherein the level member is rotationally adjustable by depressing the retaining ring and spring until the retaining ring teeth disengage with the back cover teeth thereby allowing rotation of the retaining ring and glass vial.

2. The level as recited in claim 1, wherein the lower surface contains a magnet.

3. The level as recited in claim 1, wherein the number of teeth is seventy-two.

4. The level as recited in claim 1, wherein the level body is constructed of aluminum.

5. The level as recited in claim 1, wherein the front and back covers are plastic.

6. The level as recited in claim 1, wherein the front and back covers are engraved at five-degree intervals to indicate angular position of the base.

7. The level as recited in claim I wherein the first and second level members comprise:
   a. a glass vial;
   b. a concentric end cap placed on a first end of glass vial;
   c. a cam member end cap having an eccentric bearing surface, placed on a second end of the glass vial; and
   d. a pair of apertures in the level body supporting the pair of end caps wherein rotation of the eccentric end cap adjusts the level of the glass vial within the level body.

* * * * *